UNITED STATES PATENT OFFICE.

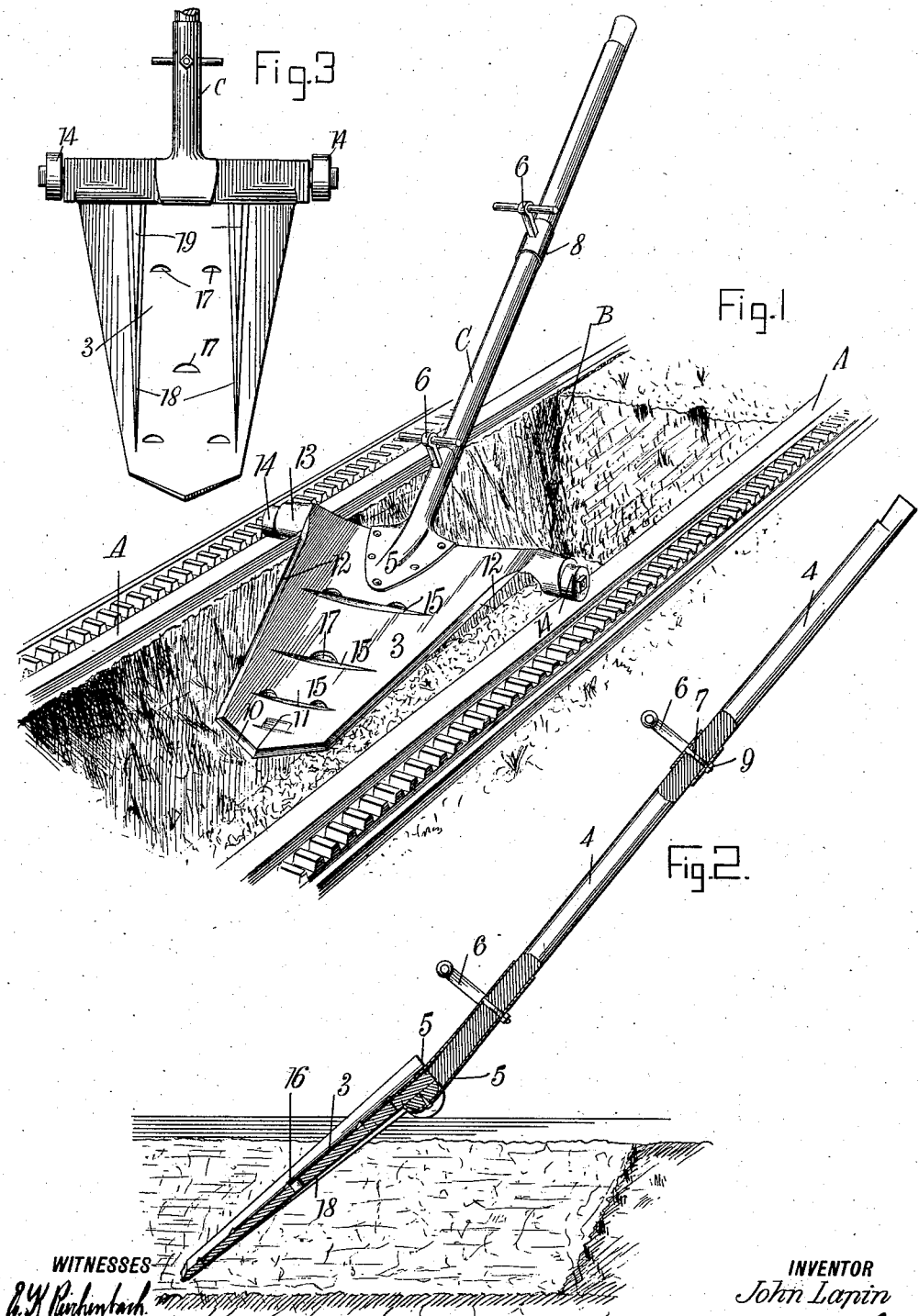

JOHN LAPIN, OF NEW YORK, N. Y.

TRENCH-DIGGING SHOVEL.

1,027,345.  Specification of Letters Patent.  Patented May 21, 1912.

Original application filed January 12, 1911, Serial No. 602,143. Divided and this application filed June 29, 1911. Serial No. 635,926.

*To all whom it may concern:*

Be it known that I, JOHN LAPIN, a subject of the Czar of Russia, and a resident of the city of New York, borough of Brooklyn, in the county of Kings and State of New York, have invented a new and Improved Trench-Digging Shovel, of which the following is a full, clear, and exact description.

My invention relates to a new and improved form of trench-digging shovels, and is a division of my application Serial No. 602,143, filed January 12, 1911.

An object of my present invention is to provide a shovel which will rapidly and effectively remove the soil, to form a trench, after the soil has been cut by the machine forming the subject-matter of the above identified divisional application.

I attain the above outlined object by using a shovel resembling in construction the long handled spade now employed for this class of work, and providing the same with laterally-extending bearings, to rest upon the tracks used by the machine in my co-pending application, to form a fulcrum, so that the shovel may be raised from the trench.

With the above and other objects in view as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in the figures, and in which—

Figure 1 is a perspective view showing a preferred embodiment of my invention in position over a trench or ditch; Fig. 2 is a vertical transverse sectional view taken axially through the shovel, and Fig. 3 is a rear view of the scoop of the shovel.

In Fig. 1, I have shown the tracks A described more in detail in my co-pending application, positioned parallel on opposite sides of the ditch B, which ditch has been outlined by the machine described in said application. This machine cuts the sides of the ditch, and as shown, the sides of this ditch are inclined downwardly and toward each other. Bridging the space between the parallel tracks, is positioned the shovel C forming the subject-matter of my present invention. This shovel has a scoop 3 of a general keystone shape in plan and slightly curved transversely and having side-edges slightly converging toward the bottom and merging into the sharply converging bottom edges. From the upper edge of this scoop extends at a slight angle as shown in Fig. 2, a handle 4, which handle extends some material distance from the scoop and is fastened to the same by means of fastening plates 5.

In order to afford a firm grip on the handle, there is extended from the handle, a pair of spaced-apart T-shaped grips 6, which grips each have a centrally-disposed bolt 7 passing through the handle 4 and through a sleeve 8, said grips being held in position by means of nuts 9 screw-threaded on to the lower ends of the bolts 7. The lower end of the scoop 3 has downwardly-converging edges 10 meeting at a central point 11.

By means of the above construction, the shovel may be grasped by the grips 6 and forced into the soil between the cut sides.

Extending laterally from each upper side 12 of the scoop 3, is an extension 13, at the outer end of which extensions are journaled bearing rollers 14, which bearing rollers are adapted to rest upon the tracks A and form a turning line, so that as the shovel is forced into the soil the rollers will come in contact with the track, and then rotating the shovel by bearing down upon the handle 4, the shovel will act as a lever with the rollers 14 as fulcrum points, to detach and raise the soil from its position in the ground.

In order to grip the earth on the scoop, there is disposed across the face of the shovel, a series of ridges 15 triangular in cross section, to form an upwardly facing ledge 16. The effect of these ridges is to form a roughened surface to the shovel, which will not interfere with its penetration into the ground, but will have the effect of withdrawing the dirt and tend to retain the same on the scoop. In order to drain off the water from the soil, there is provided in the scoop of the shovel, a series of apertures 17, in this case shown to be semi-circular in cross section.

In order to guide the shovel into the soil there is extending lengthwise along the rear of the scoop 3ª a pair of spaced apart ribs 18, triangular in cross section at their lower end and flattened toward the handle as shown at 19.

While a preferred embodiment of the invention has been described, it is to be understood that many changes could be made in the above construction and many apparently widely different embodiments of this invention could be made without departing from the scope thereof. It is intended that all matters contained herein in the above description or shown in the accompanying drawings, shall be interpreted as illustrative and not in a limiting sense. It is also to be understood that the language used in the following claims is intended to cover the full scope of the invention and is not to be given any narrower construction than the prior art demands, and that materials, sizes and relativities of parts are non-essential, except as called for in the claims.

Having thus described my invention, I claim as new and desire to secure by Letters Patent:

1. In a trenching shovel having a scoop, a series of ridges triangular in cross section disposed on the face of said scoop, to form upwardly facing ledges.

2. In a trenching shovel having a scoop, a series of ridges triangular in cross section disposed on the face of said scoop, to form upwardly facing ledges, said scoop having a series of apertures extending therethrough above and adjacent the upper edge of said ridges.

3. A trenching shovel having a scoop of general keystone shape in plan and slightly curved transversely, said scoop having disposed on the rear thereof a pair of longitudinally extending spaced apart ribs triangular in cross section at their lower ends and flattened toward the upper end of the scoop.

In testimony whereof I have signed my name to this specification in the presence of two subscribing witnesses.

JOHN LAPIN.

Witnesses:
W. S. ORTON,
PHILIP D. ROLLHAUS.